(12) United States Patent
Nørgaard et al.

(10) Patent No.: US 9,206,029 B2
(45) Date of Patent: Dec. 8, 2015

(54) DISPENSING NOZZLE COVER

(75) Inventors: Jens Nørgaard, Frederiksberg (DK); Jens Rasmus Andersen, Copenhagen (DK)

(73) Assignee: NORGAARD & ANDERSEN APS, Copenhagen V (DK)

( * ) Notice: Subject to any disclaimer, the term of this patent is extended or adjusted under 35 U.S.C. 154(b) by 0 days.

(21) Appl. No.: 14/118,457

(22) PCT Filed: May 25, 2012

(86) PCT No.: PCT/DK2012/050180
§ 371 (c)(1),
(2), (4) Date: Nov. 18, 2013

(87) PCT Pub. No.: WO2012/159636
PCT Pub. Date: Nov. 29, 2012

(65) Prior Publication Data
US 2014/0061256 A1 Mar. 6, 2014

(30) Foreign Application Priority Data
May 25, 2011 (DK) .................................. 2011 70260

(51) Int. Cl.
| B65D 47/00 | (2006.01) |
| B67D 1/08 | (2006.01) |
| A01M 1/16 | (2006.01) |
| A01M 1/02 | (2006.01) |
| A01M 1/14 | (2006.01) |

(52) U.S. Cl.
CPC ............... *B67D 1/0887* (2013.01); *A01M 1/02* (2013.01); *A01M 1/14* (2013.01); *A01M 1/16* (2013.01)

(58) Field of Classification Search
CPC ........... A01M 1/02; A01M 1/14; A01M 1/16; B67D 1/0887
USPC .......................... 222/562, 563; 137/380, 381; 43/114–117
See application file for complete search history.

(56) References Cited

U.S. PATENT DOCUMENTS

| 1,058,637 | A | * | 4/1913 | Shepard et al. ................ 137/381 |
| 1,142,579 | A | * | 6/1915 | Jones ...................... F16K 27/08 137/381 |
| 1,850,359 | A | * | 3/1932 | Simmons ....................... 137/381 |
| 2,164,666 | A | * | 7/1939 | Simmons ....................... 137/313 |
| 3,410,303 | A | * | 11/1968 | Johnson, Jr. ................... 137/381 |
| 6,311,864 | B1 | * | 11/2001 | Land ....................... B65D 47/06 220/718 |
| 2007/0044435 | A1 | * | 3/2007 | Sotile .............................. 53/420 |
| 2008/0217283 | A1 | * | 9/2008 | Conforti et al. ................ 215/200 |
| 2014/0013651 | A1 | * | 1/2014 | Moss ............................... 43/114 |

* cited by examiner

*Primary Examiner* — Daniel R Shearer
(74) *Attorney, Agent, or Firm* — Nath, Goldberg & Meyer; Jerald L. Meyer; Christopher Thomas

(57) ABSTRACT

Provided herein is a dispensing nozzle cover with features including an elongated chamber having a proximal end and a distal end, where the proximal end is adapted to receive a dispensing nozzle, and the distal end is closed, a seal arranged in the vicinity of the proximal receiving end of the elongated chamber, the seal being arranged to seal against the dispensing nozzle, and an adhesive surface area facing the ambient atmosphere.

19 Claims, 3 Drawing Sheets

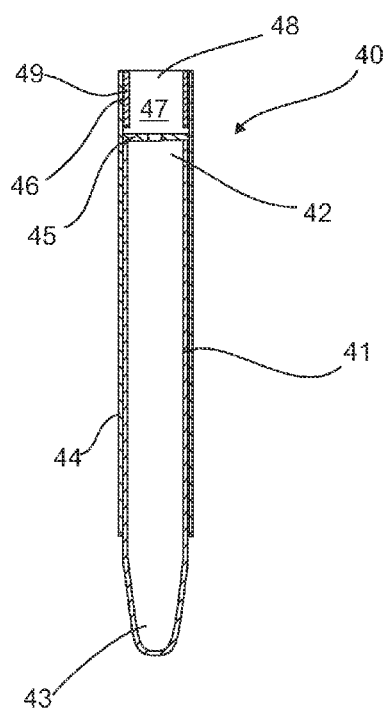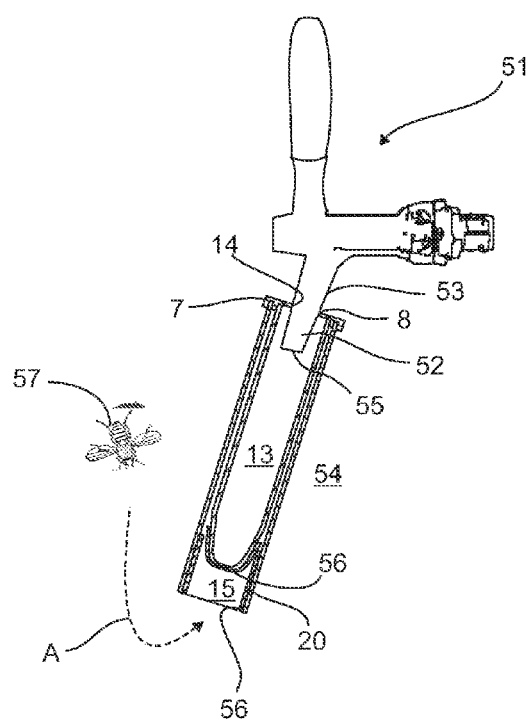
Fig.4                    Fig.5

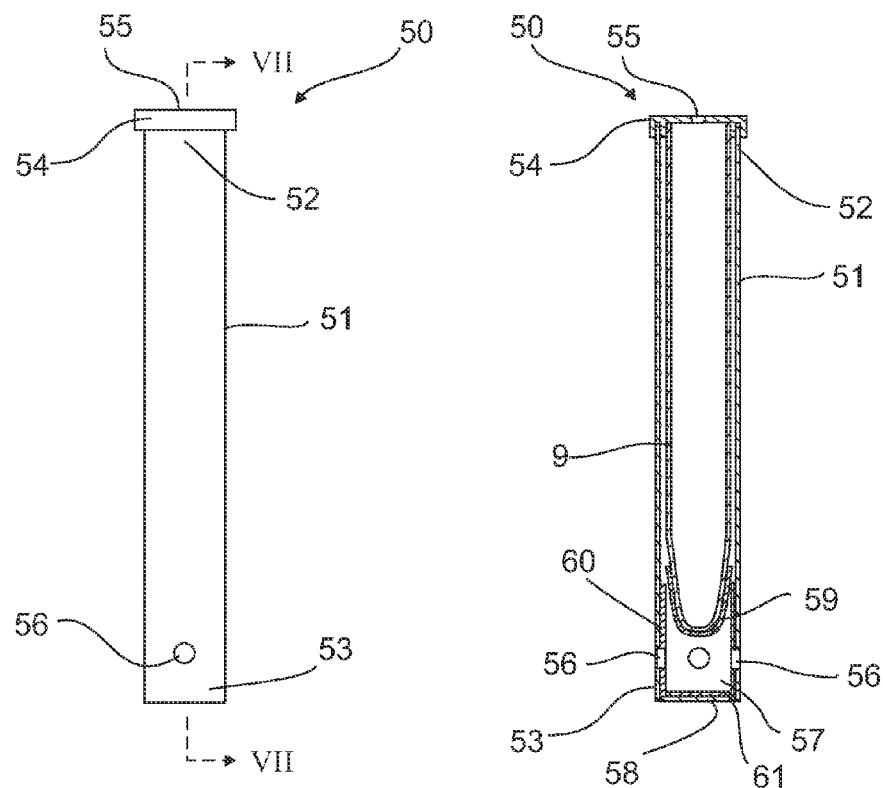
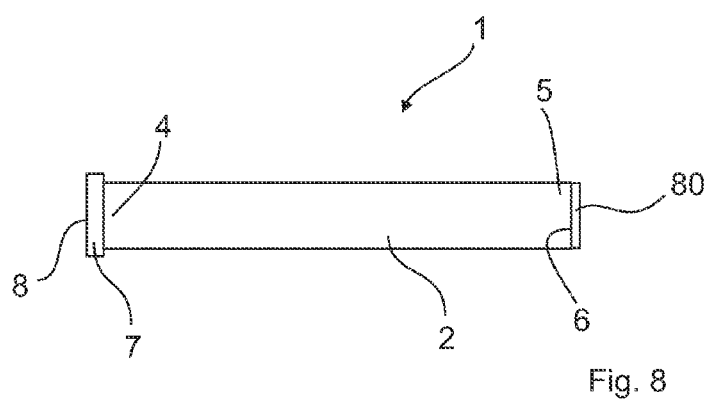

DISPENSING NOZZLE COVER

This is a National Phase Application filed under 35 U.S.C 371 as a national stage of PCT/DK2012/050180, filed on May 25, 2012, an application claiming the benefit from Danish Application No. PA 2011 70260, filed on May 25, 2012, the entire content of each of which is hereby incorporated by reference in its entirety.

The invention relates to a dispensing nozzle cover comprising an elongated chamber having a proximal end and a distal end, where the proximal end is adapted to receive a dispensing nozzle, and the distal end is closed, a seal arranged in the vicinity of the proximal receiving end of the elongated chamber, the seal being arranged to seal against the dispensing nozzle.

Cafés, restaurants and similar facilities that, amongst other things, sell beverages to their customers often have their beverage dispensers arranged in the ambient space of the establishment. This is the case for soft drink dispensers and beer dispensers, which are arranged close to a counter or a work table for the serving staff.

The beverage dispensers are often arranged above counter so that the staff has easy access to the dispenser, and on which the beverage suppliers often place a sticker or a shield showing the brand of beverage being dispensed from the dispenser.

Often, the beverage is dispensed from a tap, such as a beer tap, which is a valve controlling the release of the liquid from a beverage nozzle. Other types of beverages may be dispensed from e.g. a pre-or post-mix dispenser, which may mix a concentrate with water before dispensing the finalised liquid from a dispensing nozzle into a beverage container. Often, these types are used for dispensing soft drinks.

Other types of dispensers may be seen as condiment dispensers, such as ketchup or mustard dispensers providing a flow of liquefied condiments from a dispensing nozzle.

A widely recognised problem with the above-mentioned dispensers is that when the liquid has been dispensed from the nozzle, the nozzle is contaminated with the liquid having been dispensed. This means that there is usually a residue of the liquid being dispensed that remains within the nozzle or on the outer surface of the nozzle. This means that outside the business hours of the establishment, the nozzles have to be cleaned for hygienic and sanitary purposes to ensure that the residue does not contaminate the liquid to be dispensed subsequently. This cleaning is often performed prior to opening of the establishment, e.g. in the case of a bar or a tavern before the bar is opened for customers in the morning or early afternoon. Hence, the residue has often been sitting on the nozzle overnight or for a considerable amount of time.

When the dispensing device dispenses liquids that have a sweet ingredient such as sugars, the residue on the dispensing nozzle may attract insects such as flies, often called barflies, which are often very difficult or impossible to eradicate completely within a food or beverage serving establishment such as a restaurant, a bar, a café, etc. Often, the insects or especially flies may be considered highly unsanitary as they may bear bacteria or viral substances that may contaminate the dispensing nozzle even further. Thus, in order to maintain a satisfactory sanitary condition for dispensing nozzles, there have been some attempts to minimise the insects' access to the nozzle.

U.S. Pat. No. 3,918,616 discloses a hygienic nozzle cover for an automatic or receptacle actuated dispensing device, said cover being moveable from a first position extending over the beverage nozzle and hygienically sealing its opening to form a closure over the opening to a second position to allow for the dispensing of the beverage. The disclosed nozzle cover closes off the end of the nozzle, which means that if a droplet of beverage has been splashed or spilled on the outer surface of the nozzle during dispensing, the droplet may attract insects, and especially flies. Furthermore, the nozzle cover is a complex mechanism that opens and closes during use, which means that the nozzle cover has to be specifically constructed having specific dimensions for each dispensing device.

US 2009/0000486 discloses an outlet sleeve of soft drink and post-mix systems, in which the outlet sleeve includes a closure mechanism. This device provides a closure preventing the penetration of insects into the sleeve in order to reduce health risks. The disclosed outlet sleeve cover closes off the end of the sleeve, which means that if a droplet of beverage has been splashed or spilled on the outer surface of the sleeve during dispensing, the droplet may attract insects, and especially flies.

The presence of flies on the outer surface of the nozzle and/or the sleeve causes a hygienic issue as often, either by accident or by intention; the outer surface of the nozzles or sleeves of dispensing devices often comes into contact with the liquid, when the liquid is in the container. For carbonated drinks, such as beers and/or soft drinks, it may be advantageous to submerge the nozzle into the liquid as this often reduces the frothing of the carbonated drink.

In accordance with the invention, there is provided a dispensing nozzle cover comprising an elongated chamber having a proximal end and a distal end, where the proximal end is adapted to receive a dispensing nozzle, and the distal end is closed, a seal arranged in the vicinity of the proximal receiving end of the elongated chamber, the seal being arranged to seal against the dispensing nozzle, wherein the dispensing nozzle cover further comprises an adhesive surface area facing the ambient atmosphere.

This means that when the nozzle cover is arranged on a dispensing nozzle, the receiving end of the nozzle cover is inserted into the elongated chamber, and the seal ensures that insects and especially flies will not have access to the nozzle opening of the dispensing nozzle. Thus, the hygiene of the dispensing nozzle has been improved by isolating the nozzle opening from the ambient space.

When drops or droplets of liquids are present on the dispensing nozzle, there may often be residues of liquids coming into contact with an external surface of the nozzle cover during or after the positioning of the nozzle cover onto the nozzle. The residues may be transferred to areas of the nozzle cover where the nozzle cover or especially the seal comes into contact with the dispensing nozzle during mounting of the nozzle cover. If the liquid residues have a sugary content, there is a risk that the residues will attract insects and especially flies that may come into contact with the residue and feed on it. By providing the nozzle cover with an adhesive surface, the flies will be caught by the adhesive when they come into contact with it. Catching the flies may be advantageous for reducing the amount of flies inside the room or volume in which the dispensing nozzle is arranged and may also improve the hygiene surrounding the dispensing nozzle as the insects and/or flies caught will not contaminate the external surface of the dispensing nozzle.

In one embodiment of the invention, the adhesive surface is a layer of fly capture adhesive. The fly capture adhesive may be fragrant for attracting flies. The fragrant may be a sweet fragrant, a hormonal fragrant or any fragrant attracting flies. Thus, the adhesive may be used to attract the insects or flies and thereby minimise the risk that the insects or flies will be attracted by any residue of liquids present on the seal or the elongated chamber.

In one embodiment of the invention, the adhesive surface area may be arranged on an outer surface of the elongated chamber. This means that if the flies come into contact with the adhesive surface, they will be immobilised in an area distant from the nozzle or the seal. Thus, the flies will not be capable of transferring contaminants to the nozzle or the seal after they have been immobilized.

In one embodiment of the invention, the seal may be a diaphragm seal having an opening with an inner periphery for receiving the nozzle, and where the inner periphery of the opening is arranged to seal against an outer surface of the dispensing nozzle. This means that the nozzle can slide into the opening, and the inner periphery will be in close contact with the outer surface of the nozzle providing a liquid and/or gas-tight seal ensuring that contaminants or especially flies will not be capable of passing the seal in order to reach the dispensing nozzle opening or a surrounding free end of the dispensing nozzle.

In one embodiment of the invention, the seal may be made of a flexible material adapted to seal resiliently against an outer surface of the dispensing nozzle. By providing the seal in the form of a resilient material, such as a rubber, elastomeric or thermoplastic seal, the seal may be resiliently adapted around the dispensing nozzle. This means that the size of the dispensing nozzle is not critical to the dispensing nozzle cover as the flexible material may be adapted to the outer diameter of the nozzle. Hence, the same nozzle cover may be used on two differently shaped or formed nozzles without the nozzle cover having to be adapted beforehand. Furthermore, this means that the seal may be used for a nozzle having a conical shape or a shape without uniform diameter or dimensions of the nozzle.

Furthermore, a nozzle cover having a diaphragm seal or a flexible seal may be used to seal around nozzles that are provided at an angle from horizontal or vertical as many of the beer nozzles on the market are provided at an angle so that it is easier for the bartender to pour a beer by tilting the glass without the beer frothing or foaming excessively in the glass.

In one embodiment of the invention, the seal may be made of a material having a predetermined shape and size to seal against an outer surface of a dispensing nozzle. This means that the nozzle cover may be prefabricated and shaped to fit a specific kind of dispensing nozzle in order to prevent that a nozzle cover provided by the beverage manufacturer or supplier may be used in conjunction with a nozzle from a competing brand. This may be especially important if the nozzle cover is provided with an advert or a brand name for a specific brand of beverage, such as Carlsberg™ or Coca-Cola™.

In one embodiment of the invention, the dispensing nozzle cover may further comprise a tubular member radially surrounding an outer surface of the elongated chamber having a proximal end, which abuts the elongated chamber, and an open distal end. The tubular member may be arranged around at least part of the outer surface of the elongated chamber so that the tubular member covers the outer surface along its outer circumference. The proximal end of the tubular member may be [??] onto the elongated chamber, and the open distal end ensures that the distal end of the elongated chamber does not prevent the tubular member from being manoeuvred in an axial direction. This means that the distal end of the elongated sheath may pass the open distal end of the tubular member, and the elongated member may be manoeuvred inside an axial volume of the tubular member.

In one embodiment, the adhesive surface may be arranged on the tubular member.

In one embodiment of the invention, the tubular member may be removably attached to the elongated chamber. This means that the tubular member may be removed from the elongated chamber in order for it to be cleaned or to be replaced with a new tubular member. The tubular member may be adapted so that the user will only need to handle the tubular member, and not the elongated chamber, when positioning the nozzle cover onto its corresponding nozzle. Further, the tubular member may be adapted to hold the adhesive surface of the nozzle cover so that the tubular member may be replaced when the adhesive is worn out or has served its purpose. Thus, the elongated chamber may be a reusable part, while the tubular member is arranged as a single-use part that is replaced on a regular basis, e.g. after every use. This ensures that when the nozzle cover has been used, it may be provided with a new and uncontaminated adhesive surface.

In one embodiment of the invention, the tubular member may radially surround the whole outer surface of the elongated chamber. This may means that the elongated chamber is inserted in its entirety into the tubular member so that the outer surface of the side walls is not in a position to be touched by the fingers of the user. Furthermore, this may be seen as being more hygienic as the insects or flies will not be able to come into direct contact with the side walls of the elongated chamber.

In one embodiment of the invention, the open distal end of the tubular member may extend in an axial direction beyond the distal end of the elongated chamber defining a first volume between the open distal end of the tubular member and the distal end of the elongated chamber, and alternatively the adhesive surface may be provided on a surface area of the first volume. This means that the distal end of the elongated chamber is arranged inside the volume defined by the tubular member, and the outer surface area of the elongated chamber and inner surface of the tubular member inside the volume may be provided with the adhesive surface. Thus, it is possible to lure the insects or flies to an area of the nozzle cover that is distant from the proximal receiving end of the elongated chamber, and thereby reducing the risk that the insects or flies will contaminate the receiving area of the elongated chamber. The flies may therefore be attracted into the open distal end of the tubular member by the fragrance of the adhesive and be immobilized within the inner volume of the tubular member. Thus, the outer surface of the tubular member may be free of adhesive making the nozzle cover easy to handle by the users and ensuring that the user does not touch the adhesive or any insects or flies that may be immobilised by the adhesive.

In one embodiment of the invention, the adhesive surface area may cover at least part of the surface area of the tubular member facing the elongated chamber.

In one embodiment of the invention, a proximal end of the tubular chamber may extend in an axial direction beyond the proximal end of the elongated chamber, defining a second volume between the proximal end of the tubular member and the proximal end of the elongated chamber. This means that the proximal end of the elongated chamber is arranged inside the tubular member so that when the nozzle cover is arranged on a dispensing nozzle, the nozzle enters the second volume first and enters the proximal end of the elongated chamber subsequently. This means that the side walls of the tubular member defining the second volume make the path to the proximal opening of the elongated chamber difficult for an insect or a fly and thereby reduce the risk that an insect or a fly will get access to the area.

In one embodiment of the invention, the adhesive surface area may be arranged on the inner surface of the tubular member inside the second volume. This means that if an insect or a fly gets into the second volume, there is a high probability that the insect or fly gets caught by the adhesive on the inner surface of the tubular member. Thus, the risk that an insect or a fly will get into contact with the proximal end of the elongated chamber is minimal, which ensures that the seal and the outer surface of the nozzle being in contact with the seal will not be contaminated by the insects or flies.

In one embodiment of the invention, the adhesive surface area may be arranged on an outer surface of the elongated chamber and/or the tubular member.

In one embodiment of the invention, the distal end of the tubular member may be closed and a side wall of the tubular member comprises at least one through-going opening, allowing access from the outside of the tubular member to the inner volume of the tubular member, This means that insects or flies may access the tubular member via the through-going opening and be captured by the adhesive surface area that may be arranged inside the tubular member. Thus, the tubular member may protect the fingers of a person operating the nozzle cover from coming into contact with the adhesive surface area prior to attaching it to a dispensing nozzle, or after use, when removing the nozzle cover from a dispensing nozzle.

The invention is explained in detail below with reference to the drawings, in which FIG. 1 is a side view of a dispensing nozzle cover according to the invention, FIG. 2 is a sectional view of the same taken along axis II-II, FIG. 3 is a sectional view of a second embodiment of a dispensing nozzle cover according to the invention, FIG. 4 is a sectional view of a third embodiment of a dispensing nozzle cover according to the invention, FIG. 5 is a side view of a beer tap having a dispensing nozzle cover according to the invention.

FIG. 6 is a side view of a dispensing nozzle according to the invention,

FIG. 7 is a sectional view of the same taken along axis VII-VII in FIG. 6, and

FIG. 8 is a side view of a dispensing nozzle cover having a removable closure at the distal end of the cover.

Figure 1:
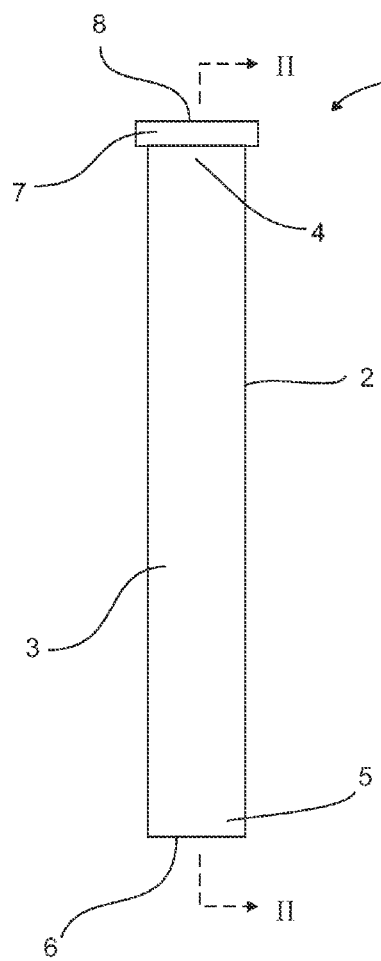

FIG. 1 shows a dispensing nozzle cover 1 according to the invention, where the dispensing nozzle cover has a tubular sheath 2 having an outer surface 3 and a proximal end 4 and a distal end 5. The distal end 5 of the distal sheath has an opening 6, which provides access to the inner volume of the tubular sheath 2. Close to the proximal end 4 of the tubular sheath 2, the nozzle cover 1 is provided with a diaphragm seal 7 with a through-going opening 8, which allows the seal 7 to receive the nozzle of e.g. a beverage pump or tap (not shown).

Figure 2:
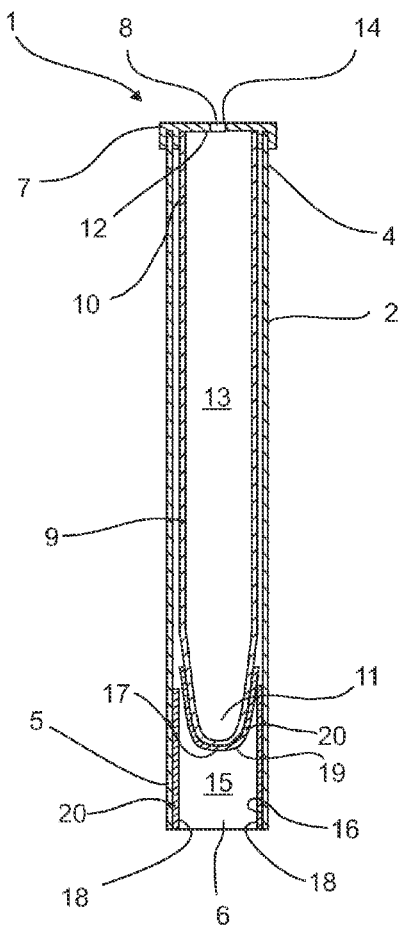

FIG. 2 shows a sectional view of the nozzle cover of FIG. 1, where it may be seen that the nozzle cover 1 is provided with an elongated chamber 9 having a proximal end 10 for receiving a nozzle (not shown) and a distal end 11 that is closed. The seal 7 closes off the opening 12 in the proximal end 10 of the elongated chamber 9, where the opening 8 of the seal 7 provides access to the inner volume 13 of the elongated chamber 9. Thus, as shown in FIG. 5 when a tap 51 is inserted into the opening 8 of the seal 7, the inner rim 14 of the seal will come into contact with the external surface 52 of the dispensing nozzle 53 of the tap 51 providing a sealed connection. This means that the inner volume 13 of the elongated chamber 9 will be isolated from the ambient space 54 and will protect the opening 55 of the dispensing nozzle 53.

In FIG. 2 the distal end 5 of the tubular sheath 2 extends beyond the distal end 11 of the elongated chamber 9 so that a second volume 15 is present between the opening 6 in the distal end 5 of the tubular sheath and the outer surface 16 of the distal end 11 of the elongated chamber 9. The inner surface 17 of the tubular sheath 2 inside the second volume 15 and the external surface 16 of the distal 11 end of the elongated chamber 9 are provided with a first and a second adhesive layer 18, 19 of an adhesive 20. As shown in FIG. 5, the adhesive 20 may be an adhesive that is constructed to attract insects or flies in order to lure the insects or flies away from the area where the seal 7 is connected to the dispensing nozzle 53 and into the second volume 15. Inside the second volume, the flies will come into contact with the adhesive 20 and will be immobilised by the adhesive 20.

Figure 3:
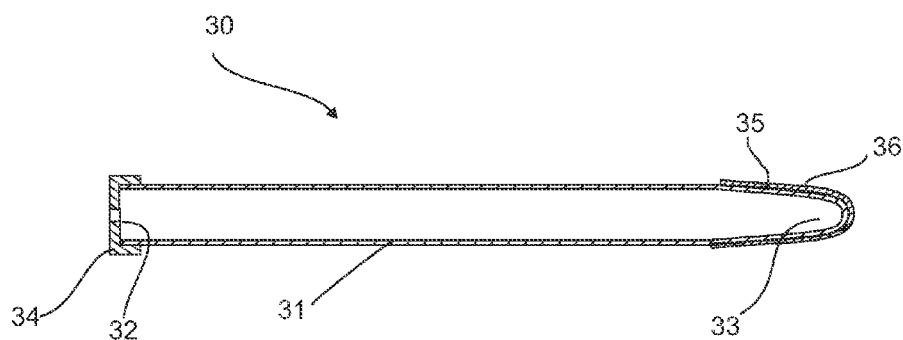

FIG. 3 shows a second embodiment of a dispensing nozzle cover 30 according to the invention. The nozzle cover 30 comprises an elongated chamber 31 having an open proximal end 32 for receiving a dispensing nozzle (not shown) and a closed distal end 33. The proximal end 32 of the elongated chamber is provided with a seal 34, similar to or the same as the seal 7 shown in FIG. 1 and FIG. 2. The outer surface 35 of the distal end 33 of the elongated chamber 31 is provided with a layer of adhesive 36 that is capable of attracting insects or flies and immobilising them when they come into contact with the adhesive surface 37. Thus, the adhesive attracts the insects away from the seal so that when mounted on a dispensing nozzle (not shown), the flies will be attracted to areas of the nozzle cover that are distal to the proximal receiving end 32 as shown by arrow A.

FIG. 4 shows an alternative embodiment of a nozzle cover 40 according to the invention. The nozzle cover 40 has an elongated chamber 41 having a proximal receiving end 42 and a closed distal end 43 and a tubular sheath 44 surrounding a part of the elongated chamber 41. The proximal receiving end 42 is provided with a seal 45 adapted to receive a dispensing nozzle (not shown) similar to that of the nozzle covers of FIGS. 1, 2 and 3. The proximal end 46 of the tubular sheath extends in an axial direction beyond the proximal end 42 of the elongated chamber 41 so that a third volume 47 is arranged between the opening 48 of the tubular sheath and the seal 45. The inner surface of the tubular sheath inside the third volume 47 is provided with an adhesive layer 49 so that if an insect or a fly manages to access the third volume 47 and comes into contact with the surface of the adhesive 49, it will get caught on the adhesive which immobilises the insect or fly.

FIGS. 5 and 6 show an alternative embodiment of a dispensing nozzle cover 50 according to the invention. The dispensing nozzle cover 50 is similar to the dispensing nozzle cover 1 of FIGS. 1 and 2. The dispensing nozzle cover 50 is provided with a tubular sheath 51, having a proximal end 52 and a distal end 53. The distal end 53 of the tubular sheath 51 is closed in order to prevent access to the inner volume of the tubular sheath 51 from the distal end 53. Close to the proximal end 52 of the tubular sheath 51, the nozzle cover 50 is provided with a diaphragm seal 54 with a through-going opening 55, which allows the seal 54 to receive the nozzle of e.g. a beverage pump or tap (similar to that shown in FIG. 5).

Close to the distal end 53 of the tubular sheath 51, the side wall of the nozzle cover 50 comprises at least one through-going opening 56, which allows access to the inner volume 57 of the tubular sheath 51.

The dispensing nozzle cover is provided with an elongated chamber 9, which is essentially identical to the elongated chamber 9 of FIG. 1 and FIG. 2, having essentially the same technical features as those described in relations to FIG. 1 and FIG. 2.

FIG. 7 is a sectional view of the dispensing nozzle cover 50 of FIG. 6, taken along the axis VII-VII. The distal end 53 of the tubular sheath 51 is provided with a bottom plate 58 that closes off the distal end 51 of the tubular sheath 51. As described in relation to FIG. 2, the inner surface of the tubular sheath 51 and the external surface of the distal end of the elongated chamber are provided with a first 59 and second 60 surface layer of an adhesive, to attract and capture insects or flies that come into contact with the adhesive. Furthermore, the inner surface of the bottom plate 58 may be provided with a third surface layer 61 of an adhesive, in order to increase the surface area of the inner volume 57 that is capable of capturing insects or flies.

Through-going openings 56 provide access from surroundings of the dispensing nozzle cover 50 to the inner volume 57 of the tubular sheath 51, so that the adhesive surface areas, 59, 60 and 61 are facing the ambient atmosphere. If there are insects or flies that are attracted to the dispensing nozzle when the nozzle cover 50 is attached, the insects or flies may be attracted into the inner volume 57 via the through-going openings 56. When the insects or flies have entered the inner volume, the adhesive surface layers 59, 60, 61 encompass the insects or flies from all angles, and increase the likelihood that the insect or fly will be captured by the adhesive surface layers, By providing a through-going opening 56 in the side wall of the tubular sheath 51, there is a reduced risk that the person operating the dispensing nozzle cover will come into contact with the adhesive surface of the dispensing nozzle cover 50, as the through-going opening may have a size not allowing extremities such as fingers to access the inner volume 57 of the nozzle cover, while still allowing insects or flies to access the inner volume.

Furthermore, the embodiment of FIGS. 6 and 7 may increase the sanitary appearance of the nozzle cover 50, as captured insects or flies will be encased inside the inner volume 57, and are hidden from the outside of the nozzle cover 50. Furthermore, the embodiment of FIGS. 6 and 7 increases the sanitary handling of a used nozzle cover, as the person operating the nozzle cover will not risk coming into direct contact with the insects or flies, as they are encased within the inner volume.

FIG. 8 shows a dispensing nozzle cover 1, similar to that of FIG. 1, where the open distal end 6 of the tubular sheath 2 is provided with a removable closure device 80. The closure device may be removably attached to the cover 1 during storage and prior to use, ensuring that access is prevented into the inner volume of the tubular sheath 2 prior to the actual use of the nozzle cover. Thus, when it is to be used, the person operating the nozzle cover may remove the closure 80, and provide access to the adhesive surface areas via the distal end 6. The removable cover 80, may be attached to the distal end 5 of the sheath using conventional coupling means, such as a snap-lock coupling, adhesive coupling, friction coupling, hook-and-loop (Velcro) coupling, or similar coupling means.

The invention claimed is:

1. A dispensing nozzle cover comprising
an elongated chamber having a proximal end and a distal end, where the proximal end is adapted to receive a dispensing nozzle, and the distal end is closed,
a tubular member radially surrounding an outer surface of the elongated chamber having a proximal end, which abuts the elongated chamber, and a distal end,
a seal arranged in the vicinity of the proximal receiving end of the elongated chamber, the seal being arranged to seal against the dispensing nozzle,
characterised in that the dispensing nozzle cover further comprises
an adhesive surface area facing the ambient atmosphere, wherein the distal end of the tubular member at least partly surrounds the adhesive surface area, allowing a pest to enter the tubular member and come into contact with the adhesive surface.

2. A dispensing nozzle cover according to claim 1, wherein the adhesive surface is a layer of fly capture adhesive.

3. A dispensing nozzle cover according to claim 1, wherein the adhesive surface area is arranged on an outer surface of the elongated chamber.

4. A dispensing nozzle cover according to claim 1, wherein the seal is a diaphragm seal having an opening with an inner periphery for receiving the nozzle, and where the inner periphery of the opening is arranged to seal against an outer surface of the dispensing nozzle.

5. A dispensing nozzle cover according to claim 1, wherein the seal is made of a flexible material adapted to seal resiliently against an outer surface of the dispensing nozzle.

6. A dispensing nozzle cover according to claim 1, wherein the seal is made of a material having a predetermined shape and size to seal against an outer surface of a dispensing nozzle.

7. A dispensing nozzle cover according to claim 1, wherein the tubular member is removably attached to the elongated chamber.

8. A dispensing nozzle cover according to claim 1, wherein the tubular member radially surrounds the whole outer surface of the elongated chamber.

9. A dispensing nozzle cover according to claim 1, wherein the distal end of the tubular member is open and extends in an axial direction beyond the distal end of the elongated chamber defining a first volume between the open distal end of the tubular member and the distal end of the elongated chamber.

10. A dispensing nozzle cover according to claim 9, wherein the adhesive surface is provided on a surface area of the first volume.

11. A dispensing nozzle cover according to claim 1, wherein a proximal end of the tubular chamber extends in an axial direction beyond the proximal end of the elongated chamber defining a second volume between the proximal end of the tubular member and the proximal end of the elongated chamber.

12. A dispensing nozzle cover according to claim 11, wherein the adhesive surface area is arranged on the inner surface of the tubular member inside the second volume.

13. A dispensing nozzle cover according to claim 1, wherein the adhesive surface area is arranged on an outer surface of the elongated chamber and/or the tubular member.

14. A dispensing nozzle cover according to claim 1, wherein the distal end of the tubular member is closed and a side wall of the tubular member comprises at least one through-going opening, allowing access from the outside of the tubular member to the inner volume of the tubular member.

15. A dispensing nozzle cover according to claim 7, wherein the tubular member radially surrounds the whole outer surface of the elongated chamber.

16. A dispensing nozzle cover according to claim 8, wherein the distal end of the tubular member is open and extends in an axial direction beyond the distal end of the elongated chamber defining a first volume between the open distal end of the tubular member and the distal end of the elongated chamber.

17. A dispensing nozzle cover according to claim 12, wherein the adhesive surface area is arranged on an outer surface of the elongated chamber and/or the tubular member.

18. A dispensing nozzle cover according to claim 13, wherein the distal end of the tubular member is closed and a side wall of the tubular member comprises at least one through-going opening, allowing access from the outside of the tubular member to the inner volume of the tubular member.

19. A dispensing nozzle cover comprising
an elongated chamber having a proximal end and a distal end, where the proximal end is adapted to receive a dispensing nozzle, and the distal end is closed,
a tubular member radially surrounding an outer surface of the elongated chamber having a proximal end, which abuts the elongated chamber, and a distal end,
a seal arranged in the vicinity of the proximal receiving end of the elongated chamber, the seal being arranged to seal against the dispensing nozzle,
characterised in that the dispensing nozzle cover further comprises
an adhesive surface area facing the ambient atmosphere,
wherein a proximal end of the tubular chamber extends in an axial direction beyond the proximal end of the elongated chamber defining a second volume between the proximal end of the tubular member and the proximal end of the elongated chamber,
wherein the proximal end of the tubular member at least partly surrounds the adhesive surface area, allowing a pest to enter the tubular member and come into contact with the adhesive surface.

* * * * *